Oct. 9, 1923.

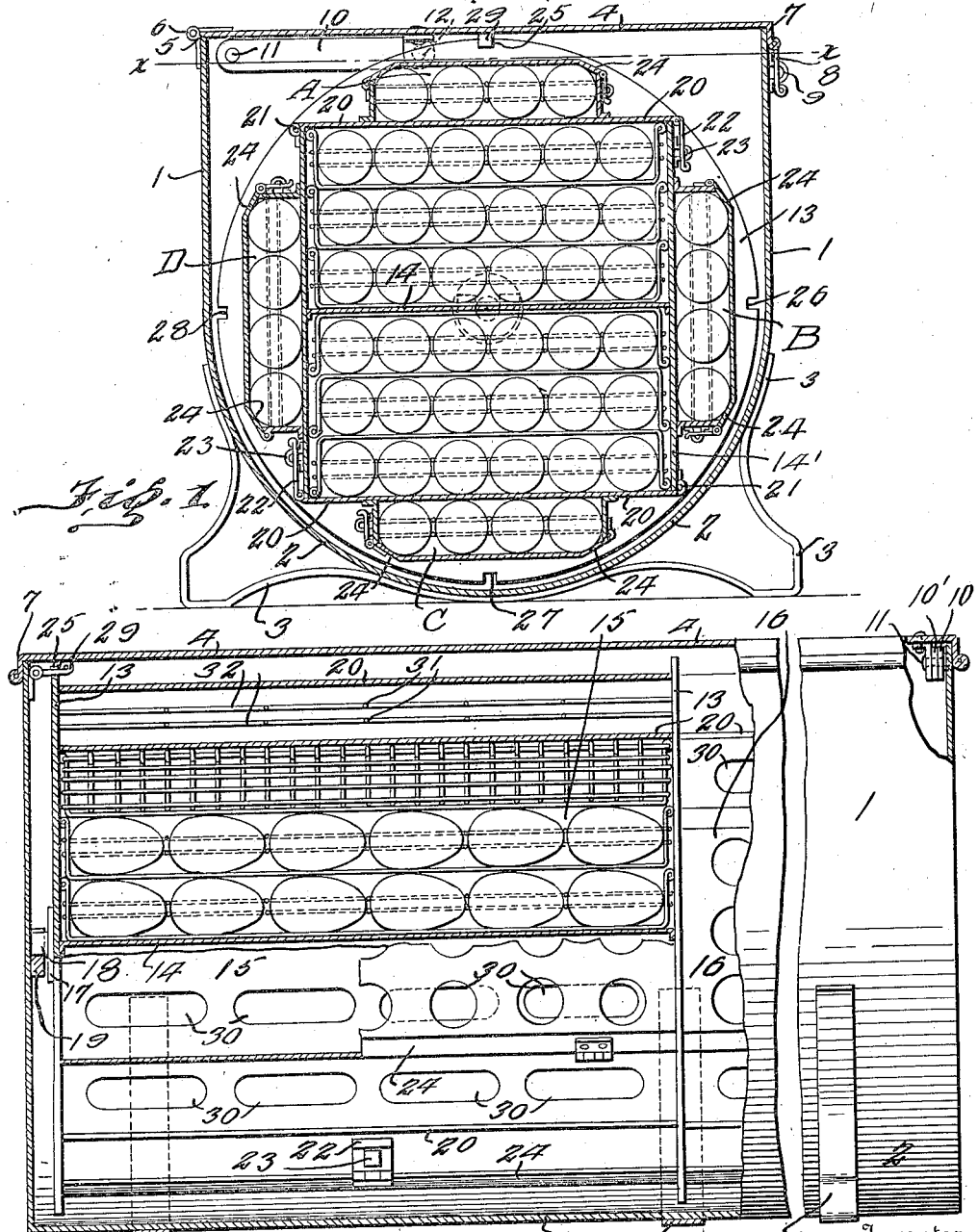

S. C. CROSS 1,469,897

APPARATUS FOR STORING EGGS

Filed April 2, 1921  2 Sheets-Sheet 2

Inventor
Samuel Clark Cross
By Semmes & Semmes
Attorneys

Patented Oct. 9, 1923.

1,469,897

UNITED STATES PATENT OFFICE.

SAMUEL CLARK CROSS, OF WASHINGTON, DISTRICT OF COLUMBIA.

APPARATUS FOR STORING EGGS.

Application filed April 2, 1921. Serial No. 458,066.

*To all whom it may concern:*

Be it known that I, SAMUEL CLARK CROSS, citizen of the United States, residing at Washington, District of Columbia, have invented certain new and useful Improvements in Apparatus for Storing Eggs, of which the following is a specification.

This invention relates to certain improvements in the method and apparatus for storage of eggs and it has particular relation to that class of such devices which are designed more particularly for household use.

As is well known, the purpose of machines of this character is to provide means whereby the force of gravity may be caused to act upon the yolks of the eggs contained within the container from different directions at different times and thus change the angle of strain exerted upon the interior structure of the eggs. In this way the muscles of the egg are not strained beyond their limit of elasticity; the yolk does not become mixed with the white of the egg but retains its normal position in the shell and deterioration of the egg is obviated. Devices of this kind heretofore constructed have been made for the use rather of wholesale dealers in eggs who keep great quantities of them in storage or for the use of large establishments, such as hotels, hospitals, etc. where the storage rooms are large and each contain several egg storing machines, which are rather large and heavy however for family use.

One of the objects I have in view therefore is the construction of a smaller, simpler machine; one of light weight which the housewife can use for the storage of a comparatively large amount of eggs for a family of the usual size but of small amount of eggs as compared with what a large hotel would use; my machine for instance, it would not be necessary to fill more than three times a year to suffice the family.

In order to make this practicable I have found it necessary to make use of quite a number of baskets each positioned within the main supporter and none of them of great size. These can be each separately lifted therefrom and readily handled without any great exertion on the part of the housewife.

With these and other objects in view which may be incident to my improvements, the invention consists in the parts and combinations to be hereinafter set forth and claimed, with the understanding that the several elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a vertical cross-sectional view of my device.

Figure 2 is a side elevation of my device partly in section so as to show the construction of the basket and the manner in which the eggs are held in place.

Figure 3:
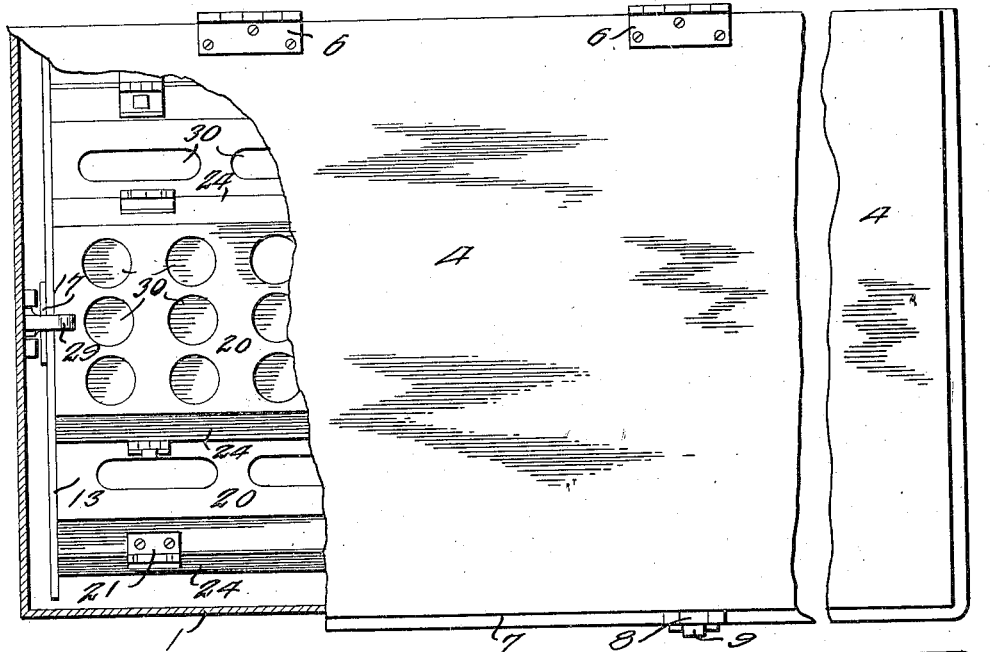
Figure 3 is a plan view of my device, with part of the top broken away.

Referring to the drawings, the numeral 1 represents the outer shell or casing of the container, preferably made of sheet metal whose sides are straight and whose bottom 2 is rounded into the straight sides. At each end of the structure and also half way between the ends are attached to the lower portion of the sides and to the bottom legs 3 upon which the casing rests. This portion of the structure is also made of sheet metal and is secured to the body of the machine by solder or in any other suitable manner.

The top of the machine is provided with a lid 4, attached to one edge of the casing at the point 5 by hinges 6 and the opposite edge thereof is bent downwardly at right angles to the plane of the top as at 7 to fit snugly thereover and is provided at one or more points along its edge with a hinged clasp 8 fitting over the hasp 9 attached to the body of the machine so that when the top or lid is down it may be secured and held in place. At 10 is shown a small iron holding bar, pivoted at 11 to the end of the structure. This bar has another member 10' pivoted to it at 12 and folded behind it. The purpose of these bars is simply to hold the lid up when it is raised in a manner similar to the way the top of a trunk is ordinarily held in place when raised, and this feature forms no part of my invention.

Now, referring to Figure 2 the main egg supporter comprises a box like structure which includes three disks 13, one near each end of the outer casing and one in the middle, the three being connected by central partition plates 14 and by side plates 14'. The disks thus dividing the supporter into two sections 15 and 16. The two end disks are each provided on the outer side with two small circular plates 17 riveted or otherwise suitably secured thereto and carrying each a stud shaft 18 which revolves within a bearing 19 attached to the inner side of the outer casing so as to enable the revolution of the egg supporter within the outer casing.

The supporter is of square shape in cross-section and above the partition plate are three egg baskets and below are the same number. Each of these baskets is capable of holding crosswise six eggs and lengthwise six eggs, making a total of thirty-six eggs in each basket. The main supporter is further provided above and below on each side thereof with additional and auxiliary egg supports A, B, C, D, each adapted to hold twenty-four eggs, thus making a total of three hundred and thirty-two eggs for each of the two sections, or a total for the machine of six hundred and sixty-four eggs.

As will be noted while the outer circumference of the egg support is of cylindrical configuration the construction and arrangement of the egg baskets within the support differs from the outer casing. That is to say, the main egg supporter is square in shape having a top or lid 20 hinged at 21 and having a clasp 22 and hasp 23. Each auxiliary egg supporter A, B, C, D, is also similar constructed save that the upper corners 24 of each are bevelled off to enable each of them to fit within the outer cylindrical cover.

At four equidistant points on the circumference of the end disks are notches 25, 26, 27 and 28 and within the outer casing and at the upper ends thereof are pivoted catches 29 which fit into the notches and stationarily holds the disk. It will also be noted that the main egg supporter and the auxiliary egg supporters are each provided with numerous apertures or openings 30 in order to enable the water glass with which the outer casing is filled to flow through every portion of the egg supporters and thoroughly cover and protect all the eggs positioned therein.

The wire baskets in which the eggs are contained are quite similar in general construction to the ordinary wire desk basket save that the ends and sides do not flare but are strictly vertical so that one basket may be set upon another. The interior area of the basket, however, is partitioned off by cross wires 31 (two in number) passing transversely through the basket at each end of each egg and by longitudinal wires 32 (two in number) passing lengthwise through the basket on each side of each egg so that each egg is positioned in a little pen of its own and thus entirely protected from breakage by reason of any jar because of the fact that the pen in which it is placed is but slightly larger than the area it occupies. These additional wires are indicated by dotted lines in Figures 1 and 2.

Figure 5:
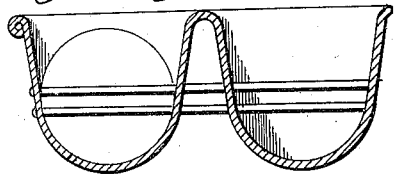
Figure 5 is a sectional view of a modified form of egg basket.
Figure 4:
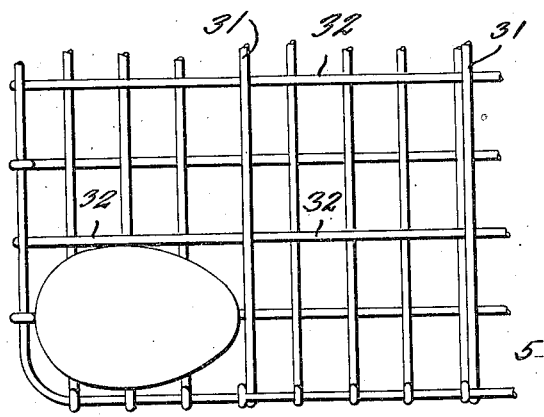
Figure 4 is a detached view of part of an egg basket.
Figure 6:
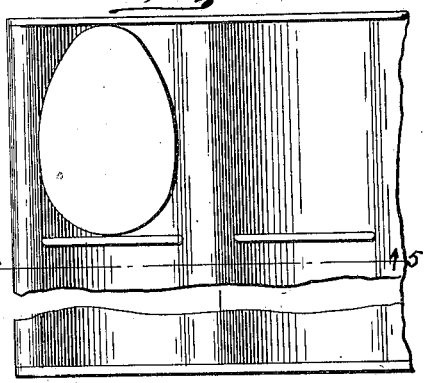
Figure 6 is a plan view thereof.

In Figures 5 and 6 I show a modified construction of egg basket. In this instance the basket is made of curved or fluted sheet metal, the eggs lying in the curves. There are two cross wires transversely through the fluted portion at each end of each egg, similar to the cross wires in the all-wire baskets and this form of construction is preferred by some users, but either form is furnished to the trade as desired.

Each machine includes one revoluble element divided into two sections, and the two sections, precisely alike are divided into compartments.

The manner of storing the eggs is as follows:

The lid 4 of the outer casing is lifted and held in position by the holding bars 10 and 10'. The lid of the basket beneath the casing lid (with its auxiliary egg supporter on top) is then raised, the three egg baskets beneath are then lifted out, the various individual cells in the baskets each filled with an egg and the baskets replaced, the first being placed upon the central partition in the supporter and the other two positioned one on top of the other, the respective outer walls of each basket resting upon the walls of the one beneath it. The lid of the basket is then lowered and the same tightly secured by means of its clasp. The lid of the auxiliary basket located upon the lid just closed is then lifted, the proper number of eggs placed therein whereupon the lid of the auxiliary basket is closed and tightly secured by means of its clasp. The catch 29 is then lifted out of the notch and the main egg supporter moved by hand a quarter revolution when the annular catch drops into the next notch when the same procedure is used in filling the auxiliary side basket as was used in the last auxiliary basket. The main egg supporter is then given another quarter revolution when the catch drops into the next notch and the same procedure is gone through with as in filling the first three baskets of the main egg supporter and its auxiliary basket. The angular catch is again lifted, the main supporter given another quarter revolution, when the next auxiliary side basket is reached and the same filled as the previous side basket the filling of the entire section with eggs has been completed. The baskets after being filled with eggs are placed in the compartments and the lid to each fastened. When one section is filled then the next section is similarly filled and the container is then filled with water glass up to the line x—x, when the lid of the outer casing is lowered and fastened tightly, and the machine is ready to be placed in its proper place in the store room.

Every two or three weeks, the top of the lid of the outer casing is raised, the catch within is lifted from the notch and the main egg supporter given a quarter revolution by hand. This takes but a few moments and is all that is necessary to keep the eggs in good condition.

I claim as my invention:—

1. An apparatus for storing eggs comprising a stationary outer casing, a main revoluble egg container mounted within the outer casing, means to hold the eggs stationary within said container as it revolves, and auxiliary containers mounted upon the main container and revoluble with the main container.

2. An apparatus for storing eggs comprising a stationary outer casing, a revoluble egg container mounted within the outer casing, comprising box like compartments for holding the eggs stationary within said container as it revolves.

3. An apparatus for storing eggs comprising a stationary outer casing, a main revoluble egg container mounted within the outer casing divided into box like compartments for holding one or more receptacles for eggs, and auxiliary containers mounted upon the main container and revoluble with the main container.

4. An apparatus for storing eggs comprising an outer casing, a main revoluble egg container mounted within said outer casing and divided into box like compartments, a basket for eggs in each compartment, auxiliary containers mounted upon the main container and revoluble therewith, said main container and auxiliary containers each being provided with apertures to permit preserving liquid placed within the casing to flow within the main and auxiliary containers and cover the eggs.

5. An apparatus for storing eggs comprising an outer casing, a main revoluble egg container therein divided into box-like compartments for egg receptacles each with a hinged lid and means to securely hold the lid in place, and auxiliary containers mounted upon the main container, the main container and the auxiliary container each having apertures therein to permit preserving liquid placed within the casing to flow within the main and auxiliary containers and cover the eggs.

6. An apparatus for storing eggs comprising an outer casing, a main revoluble egg container therein divided into box-like compartments for egg receptacles each with a hinged lid and means to securely hold the lid in place, and auxiliary containers mounted upon the main container each with a hinged lid and means to securely hold its lid in place, the main container and the auxiliary containers each having apertures therein to permit preserving liquid placed in the casing to flow within the main and auxiliary containers and cover the eggs.

7. In an apparatus for storing eggs, the combination with an outer casing, a main revoluble egg container with the casing divided into box-like compartments, and auxiliary containers mounted upon the main container, of egg baskets placed in the compartments of said main and auxiliary containers, each such basket comprising wire sides, bottoms and ends, with transverse and longitudinal wires dividing each basket into a plurality of individual cells in such manner that each cell will hold securely in place a single egg and protect it against breakage as the main container revolves.

In testimony whereof I affix my signature.

SAMUEL CLARK CROSS.